US009755931B2

(12) United States Patent
Pan

(10) Patent No.: US 9,755,931 B2
(45) Date of Patent: *Sep. 5, 2017

(54) FAULT TOLERANT DISTRIBUTED MOBILE ARCHITECTURE

(71) Applicant: Lemko Corporation, Itasca, IL (US)

(72) Inventor: Shaowei Pan, Kildeer, IL (US)

(73) Assignee: Lemko Corporation, Itasca, IL (US)

( * ) Notice: Subject to any disclaimer, the term of this patent is extended or adjusted under 35 U.S.C. 154(b) by 414 days.

This patent is subject to a terminal disclaimer.

(21) Appl. No.: 14/184,120

(22) Filed: Feb. 19, 2014

(65) Prior Publication Data

US 2014/0173388 A1 Jun. 19, 2014

Related U.S. Application Data

(63) Continuation of application No. 12/163,601, filed on Jun. 27, 2008, now Pat. No. 8,706,105.

(51) Int. Cl.
*H04W 88/02* (2009.01)
*H04W 24/00* (2009.01)
(Continued)

(52) U.S. Cl.
CPC .......... *H04L 43/0823* (2013.01); *H04L 12/66* (2013.01)

(58) Field of Classification Search
CPC ... H04W 92/045; H04W 92/06; H04W 92/08; H04W 92/14
(Continued)

(56) References Cited

U.S. PATENT DOCUMENTS

| 4,284,848 | A | 8/1981 | Frost |
| 5,590,175 | A | 12/1996 | Gallant et al. |

(Continued)

FOREIGN PATENT DOCUMENTS

| CN | 1427637 A | 7/2003 |
| CN | 1538781 A | 10/2004 |

(Continued)

OTHER PUBLICATIONS

International Search Report and Written Opinion of the International Search Authority for International Application No. PCT/US09/045957 from the International Searching Authority, mailed on Jan. 14, 2010, 8 pages.

(Continued)

*Primary Examiner* — Joshua Schwartz
(74) *Attorney, Agent, or Firm* — Toler Law Group, PC

(57) ABSTRACT

A method includes detecting a failure condition relating to a first distributed mobile architecture (dMA) gateway (dMAG) at a dMAG management system. The dMAG management system is in communication with at least the first dMAG, a second dMAG, and dMA nodes. The method also includes determining that the first dMAG is offline based on the failure condition, selecting the second dMAG, sending a first notification from the dMAG management system to the second dMAG, and sending a second notification from the dMAG management system to an external system. The external system is configured to connect calls to a mobile station via the first dMAG. The first notification instructs the second dMAG to take over operations from the first dMAG. The second notification indicates that the external system is to connect subsequent calls to the mobile station via the second dMAG.

16 Claims, 10 Drawing Sheets

(51) Int. Cl.
*H04W 36/30* (2009.01)
*H04W 4/16* (2009.01)
*H04W 64/00* (2009.01)
*H04L 12/26* (2006.01)
*H04L 12/66* (2006.01)

(58) Field of Classification Search
USPC .......................................... 370/396; 455/445
See application file for complete search history.

(56) References Cited

U.S. PATENT DOCUMENTS

| | | | |
|---|---|---|---|
| 5,623,495 A | 4/1997 | Eng et al. | |
| 5,623,532 A | 4/1997 | Houde et al. | |
| 5,713,073 A | 1/1998 | Warsta | |
| 5,734,979 A | 3/1998 | Lu et al. | |
| 5,890,064 A | 3/1999 | Widergen et al. | |
| 5,933,784 A | 8/1999 | Gallagher et al. | |
| 5,991,639 A | 11/1999 | Rautiola et al. | |
| 6,122,499 A | 9/2000 | Magnusson | |
| 6,131,038 A | 10/2000 | Sekine | |
| 6,141,564 A | 10/2000 | Bruner et al. | |
| H1918 H | 11/2000 | Hoffpauir et al. | |
| 6,160,804 A | 12/2000 | Ahmed et al. | |
| 6,411,825 B1 | 6/2002 | Csapo et al. | |
| 6,418,308 B1 | 7/2002 | Heinonen et al. | |
| 6,421,325 B1 | 7/2002 | Kikinis | |
| 6,515,985 B2 | 2/2003 | Shmulevich et al. | |
| 6,539,237 B1 | 3/2003 | Sayers et al. | |
| 6,542,497 B1 | 4/2003 | Curry et al. | |
| 6,549,937 B1 | 4/2003 | Auerbach et al. | |
| 6,584,098 B1 | 6/2003 | Dutnall | |
| 6,611,533 B1 | 8/2003 | Liao et al. | |
| 6,614,784 B1 | 9/2003 | Glitho et al. | |
| 6,631,260 B1 | 10/2003 | Carey et al. | |
| 6,647,426 B2 | 11/2003 | Mohammed | |
| 6,678,155 B1 | 1/2004 | Bresniker | |
| 6,694,134 B1 | 2/2004 | Lu et al. | |
| 6,697,355 B1 | 2/2004 | Lim | |
| 6,704,409 B1 | 3/2004 | Dilip et al. | |
| 6,731,932 B1 | 5/2004 | Rune et al. | |
| 6,735,184 B1 | 5/2004 | Davidson et al. | |
| 6,751,207 B1 | 6/2004 | Lee et al. | |
| 6,760,325 B1 | 7/2004 | Hameleers et al. | |
| 6,763,226 B1 | 7/2004 | McZeal, Jr. | |
| 6,763,233 B2 | 7/2004 | Bharatia | |
| 6,791,988 B1 | 9/2004 | Hameleers et al. | |
| 6,795,444 B1 | 9/2004 | Vo et al. | |
| 6,807,431 B2 | 10/2004 | Sayers et al. | |
| 6,807,432 B2 | 10/2004 | Hwang | |
| 6,816,706 B1 | 11/2004 | Hohnstein et al. | |
| 6,819,652 B1 | 11/2004 | Akhtar et al. | |
| 6,829,473 B2 | 12/2004 | Raman et al. | |
| 6,831,903 B2 | 12/2004 | Kang | |
| 6,839,356 B2 | 1/2005 | Barany et al. | |
| 6,859,652 B2 | 2/2005 | Karabinis et al. | |
| 6,871,072 B1 | 3/2005 | Meche | |
| 6,879,582 B1 | 4/2005 | Dhara et al. | |
| 6,879,677 B2 | 4/2005 | Trandal et al. | |
| 6,917,813 B2 | 7/2005 | Elizondo | |
| 6,937,708 B2 | 8/2005 | Hirose | |
| 6,958,983 B2 | 10/2005 | Musikka et al. | |
| 6,985,454 B1 | 1/2006 | Wiedeman et al. | |
| 7,003,286 B2 | 2/2006 | Brown et al. | |
| 7,050,414 B2 | 5/2006 | Lin | |
| 7,054,307 B2 | 5/2006 | Papadimitriou et al. | |
| 7,054,322 B2 | 5/2006 | D'Annunzio et al. | |
| 7,072,650 B2 | 7/2006 | Stanforth | |
| 7,117,015 B2 | 10/2006 | Scheinert et al. | |
| 7,120,435 B2 | 10/2006 | Usher et al. | |
| 7,120,436 B2 | 10/2006 | Kim | |
| 7,133,670 B1 | 11/2006 | Moll et al. | |
| 7,133,923 B2 | 11/2006 | MeLampy et al. | |
| 7,136,651 B2 | 11/2006 | Kalavade | |
| 7,154,901 B2 | 12/2006 | Chava et al. | |
| 7,158,621 B2 | 1/2007 | Bayne | |
| 7,171,216 B1 | 1/2007 | Choksi | |
| 7,299,039 B2 | 11/2007 | Lee et al. | |
| 7,313,399 B2 | 12/2007 | Rhee et al. | |
| 7,324,478 B2 | 1/2008 | Park et al. | |
| 7,328,268 B1 | 2/2008 | Foltak et al. | |
| 7,345,997 B2 | 3/2008 | Kim | |
| 7,346,334 B2 | 3/2008 | Gaeta et al. | |
| 7,349,412 B1 | 3/2008 | Jones et al. | |
| 7,359,700 B2 | 4/2008 | Swensen et al. | |
| 7,383,042 B2 | 6/2008 | Lamb et al. | |
| 7,385,947 B2 | 6/2008 | Wu et al. | |
| 7,406,069 B2 | 7/2008 | Yashar et al. | |
| 7,424,313 B2 | 9/2008 | Ham et al. | |
| 7,486,967 B2 | 2/2009 | Pan et al. | |
| 7,490,132 B1 | 2/2009 | Lyle et al. | |
| 7,522,632 B2 | 4/2009 | La Porta et al. | |
| 7,536,170 B2 | 5/2009 | Goldman et al. | |
| 7,539,158 B2 | 5/2009 | Pan | |
| 7,548,763 B2 | 6/2009 | Pan | |
| 7,552,670 B2 | 6/2009 | Goldman et al. | |
| 7,606,594 B2 | 10/2009 | Jesse et al. | |
| 7,647,422 B2 * | 1/2010 | Singh | H04L 12/4641 370/351 |
| 7,653,414 B2 | 1/2010 | Pan | |
| 7,738,488 B2 | 6/2010 | Marsico et al. | |
| 7,760,695 B2 | 7/2010 | Gopalakrishnan et al. | |
| 7,787,879 B1 | 8/2010 | Philips et al. | |
| 7,840,230 B2 | 11/2010 | Pan | |
| 7,855,988 B2 | 12/2010 | Pan | |
| 7,856,233 B2 | 12/2010 | Pan | |
| 7,979,066 B2 | 7/2011 | Pan | |
| 8,018,907 B2 | 9/2011 | Kubler et al. | |
| 8,036,158 B2 | 10/2011 | Pan et al. | |
| 8,046,420 B2 | 10/2011 | Pan | |
| 8,086,536 B2 | 12/2011 | Dublish et al. | |
| 8,089,920 B2 | 1/2012 | Pan | |
| 8,107,409 B2 | 1/2012 | Pan | |
| 8,213,909 B2 | 7/2012 | Lee et al. | |
| 8,224,322 B2 | 7/2012 | Pan | |
| 8,310,990 B2 | 11/2012 | Pan | |
| 8,340,667 B2 | 12/2012 | Pan | |
| 8,351,420 B2 | 1/2013 | Linkola et al. | |
| 8,359,029 B2 | 1/2013 | Pan | |
| 8,676,155 B2 | 3/2014 | Fan et al. | |
| 8,717,009 B2 | 5/2014 | Tu | |
| 2001/0013050 A1 | 8/2001 | Shah | |
| 2001/0036173 A1 | 11/2001 | Shmulevich et al. | |
| 2001/0046859 A1 | 11/2001 | Kil | |
| 2001/0055298 A1 | 12/2001 | Baker et al. | |
| 2002/0009060 A1 | 1/2002 | Gross | |
| 2002/0015392 A1 | 2/2002 | Musikka et al. | |
| 2002/0016180 A1 | 2/2002 | Derosier et al. | |
| 2002/0045444 A1 | 4/2002 | Usher et al. | |
| 2002/0051518 A1 | 5/2002 | Bondy et al. | |
| 2002/0058502 A1 | 5/2002 | Stanforth | |
| 2002/0061746 A1 | 5/2002 | Jo et al. | |
| 2002/0160772 A1 | 10/2002 | Gailey et al. | |
| 2002/0169887 A1 | 11/2002 | MeLampy et al. | |
| 2003/0048766 A1 | 3/2003 | D'Annunzio et al. | |
| 2003/0063721 A1 | 4/2003 | Hirose | |
| 2003/0088698 A1 | 5/2003 | Singh et al. | |
| 2003/0092441 A1 | 5/2003 | Taha et al. | |
| 2003/0096628 A1 | 5/2003 | Bar-On et al. | |
| 2003/0100302 A1 | 5/2003 | Armbruster et al. | |
| 2003/0100342 A1 | 5/2003 | Ham et al. | |
| 2003/0112748 A1 | 6/2003 | Puppa et al. | |
| 2003/0153343 A1 | 8/2003 | Crockett et al. | |
| 2003/0154306 A1 | 8/2003 | Perry | |
| 2003/0186694 A1 | 10/2003 | Sayers et al. | |
| 2003/0198325 A1 | 10/2003 | Bayne | |
| 2004/0014466 A1 | 1/2004 | Jesse et al. | |
| 2004/0018829 A1 | 1/2004 | Raman et al. | |
| 2004/0019539 A1 | 1/2004 | Raman et al. | |
| 2004/0156495 A1 | 8/2004 | Chava et al. | |
| 2004/0203621 A1 | 10/2004 | Brown et al. | |
| 2004/0203677 A1 | 10/2004 | Brown et al. | |
| 2004/0204097 A1 | 10/2004 | Scheinert et al. | |
| 2004/0253949 A1 | 12/2004 | Swensen et al. | |

(56) References Cited

U.S. PATENT DOCUMENTS

| | | |
|---|---|---|
| 2004/0253984 A1 | 12/2004 | Csapo et al. |
| 2004/0259556 A1 | 12/2004 | Czys |
| 2005/0044152 A1 | 2/2005 | Hardy et al. |
| 2005/0064922 A1 | 3/2005 | Owens et al. |
| 2005/0070278 A1 | 3/2005 | Jiang |
| 2005/0075106 A1 | 4/2005 | Jiang |
| 2005/0091392 A1 | 4/2005 | Gesswein et al. |
| 2005/0176413 A1 | 8/2005 | Lee et al. |
| 2005/0220054 A1 | 10/2005 | Meier et al. |
| 2005/0249176 A1 | 11/2005 | O'Neill et al. |
| 2005/0250491 A1 | 11/2005 | Roy |
| 2006/0026252 A1 | 2/2006 | Caspi et al. |
| 2006/0046714 A1 | 3/2006 | Kalavade |
| 2006/0046760 A1 | 3/2006 | Bertino et al. |
| 2006/0047836 A1 | 3/2006 | Rao et al. |
| 2006/0052113 A1 | 3/2006 | Ophir et al. |
| 2006/0063544 A1 | 3/2006 | Zhao et al. |
| 2006/0098661 A1 | 5/2006 | Pan |
| 2006/0114934 A1 | 6/2006 | Shin et al. |
| 2006/0141984 A1 | 6/2006 | Taglienti et al. |
| 2006/0142011 A1 | 6/2006 | Kallio |
| 2006/0148465 A1 | 7/2006 | Perdomo et al. |
| 2006/0159039 A1 | 7/2006 | Jung et al. |
| 2006/0203746 A1 | 9/2006 | Maggenti et al. |
| 2006/0217121 A1 | 9/2006 | Soliman et al. |
| 2006/0221912 A1 | 10/2006 | Olivier et al. |
| 2006/0234747 A1 | 10/2006 | Pan |
| 2006/0234774 A1 | 10/2006 | Pan et al. |
| 2006/0258358 A1 | 11/2006 | Kallio |
| 2007/0008968 A1 | 1/2007 | Baker et al. |
| 2007/0010245 A1 | 1/2007 | Levitan |
| 2007/0021097 A1 | 1/2007 | Gaeta et al. |
| 2007/0021118 A1 | 1/2007 | Ophir |
| 2007/0060124 A1 | 3/2007 | Kalavade |
| 2007/0076697 A1 | 4/2007 | Huotari et al. |
| 2007/0082684 A1 | 4/2007 | Rozenstrauch et al. |
| 2007/0087738 A1 | 4/2007 | Melkesetian |
| 2007/0127423 A1 | 6/2007 | Ho |
| 2007/0147598 A1 | 6/2007 | Somes et al. |
| 2007/0197215 A1 | 8/2007 | Ben-Yehuda et al. |
| 2007/0202847 A1 | 8/2007 | Pan |
| 2007/0213075 A1 | 9/2007 | Jiang |
| 2007/0230352 A1 | 10/2007 | Kokku et al. |
| 2007/0232267 A1 | 10/2007 | Pan |
| 2007/0232304 A1 | 10/2007 | Goldman et al. |
| 2007/0234892 A1 | 10/2007 | Goldman et al. |
| 2007/0243891 A1 | 10/2007 | Civanlar et al. |
| 2007/0271606 A1 | 11/2007 | Amann et al. |
| 2007/0287452 A1 | 12/2007 | Pan |
| 2007/0291910 A1 | 12/2007 | Bucchieri et al. |
| 2007/0293216 A1 | 12/2007 | Jiang |
| 2008/0013531 A1 | 1/2008 | Elliott et al. |
| 2008/0039144 A1 | 2/2008 | Pan et al. |
| 2008/0080438 A1 | 4/2008 | Gopalakrishnan et al. |
| 2008/0101314 A1* | 5/2008 | Bachmutsky ....... H04L 43/0817 370/342 |
| 2008/0101410 A1 | 5/2008 | Barkley et al. |
| 2008/0134295 A1 | 6/2008 | Bailey et al. |
| 2008/0146158 A1 | 6/2008 | Pan et al. |
| 2008/0160997 A1 | 7/2008 | Kim |
| 2008/0168523 A1 | 7/2008 | Ansari et al. |
| 2008/0244014 A1 | 10/2008 | Britton et al. |
| 2008/0261580 A1 | 10/2008 | Wallentin et al. |
| 2009/0003269 A1 | 1/2009 | Kumazawa et al. |
| 2009/0022155 A1 | 1/2009 | Rosenberg et al. |
| 2009/0031244 A1 | 1/2009 | Brezina et al. |
| 2009/0067441 A1 | 3/2009 | Ansari et al. |
| 2009/0156213 A1 | 6/2009 | Spinelli et al. |
| 2009/0186626 A1 | 7/2009 | Raghothaman |
| 2009/0215449 A1 | 8/2009 | Avner |
| 2009/0227230 A1 | 9/2009 | Camilleri et al. |
| 2009/0227235 A1 | 9/2009 | Pan |
| 2009/0228555 A1 | 9/2009 | Joviak et al. |
| 2009/0270097 A1 | 10/2009 | Gallagher et al. |
| 2009/0271491 A1 | 10/2009 | Pan |
| 2009/0292785 A1 | 11/2009 | Leedberg et al. |
| 2009/0325584 A1 | 12/2009 | Pan |
| 2009/0327819 A1 | 12/2009 | Pan |
| 2010/0008306 A1 | 1/2010 | Pan |
| 2010/0008369 A1 | 1/2010 | Pan |
| 2010/0048197 A1 | 2/2010 | Jiang |
| 2010/0048208 A9 | 2/2010 | Gunaratnam et al. |
| 2010/0057485 A1 | 3/2010 | Luft |
| 2010/0057732 A1 | 3/2010 | O'Sullivan et al. |
| 2010/0075668 A1 | 3/2010 | Pan |
| 2010/0080214 A1 | 4/2010 | Li et al. |
| 2010/0094878 A1 | 4/2010 | Soroca et al. |
| 2010/0199340 A1 | 8/2010 | Jonas et al. |
| 2010/0217809 A1 | 8/2010 | Vymenets et al. |
| 2010/0217837 A1 | 8/2010 | Ansari et al. |
| 2011/0059740 A1 | 3/2011 | Pan |
| 2011/0060853 A1 | 3/2011 | Pan |
| 2011/0223921 A1 | 9/2011 | Pan |
| 2011/0320576 A1 | 12/2011 | Lauer et al. |
| 2012/0002607 A1 | 1/2012 | Pan |
| 2012/0020293 A1 | 1/2012 | Nix, Jr. et al. |
| 2012/0044908 A1 | 2/2012 | Spinelli et al. |
| 2012/0094659 A1 | 4/2012 | Pan |
| 2012/0106454 A1 | 5/2012 | Pan |
| 2012/0224586 A1 | 9/2012 | Nag et al. |
| 2012/0252444 A1 | 10/2012 | Pan |
| 2012/0324041 A1 | 12/2012 | Gerber et al. |
| 2013/0039279 A1 | 2/2013 | Pan |
| 2013/0065583 A1 | 3/2013 | Pan |
| 2013/0130677 A1 | 5/2013 | Pan |
| 2013/0148578 A1 | 6/2013 | Pan |
| 2015/0081812 A1 | 3/2015 | Davies et al. |

FOREIGN PATENT DOCUMENTS

| | | |
|---|---|---|
| CN | 101044769 A | 9/2007 |
| CN | 101044769 B | 4/2013 |
| EP | 0365885 A2 | 5/1990 |
| GB | 2435751 B | 2/2009 |
| WO | 2006052342 A2 | 5/2006 |
| WO | 2007102003 A1 | 9/2007 |
| WO | 2008150281 A1 | 12/2008 |
| WO | 2009158154 A2 | 12/2009 |
| WO | 2009158155 A2 | 12/2009 |
| WO | 2010005648 A2 | 1/2010 |
| WO | 2010008695 A2 | 1/2010 |
| WO | 2010036439 A2 | 4/2010 |

OTHER PUBLICATIONS

"Framework and Overall Objectives of the Future Development of IMT-2000 and Systems Beyond IMT-2000", ITU-R Radiocommunication sector of ITU, Recommendation ITU-R M.1645 (Jun. 2003), M Series, Mobile, Radiodetermination, Amateur and Related Satellite Services, 2010, International Telecommunication Union, 26 pages.

Akyildiz, I et al., "Wireless Mesh Networks: A Survey", Computer Networks, Issue 47, Jan. 1, 2005, 2004 Elsevier B.V., pp. 445-487.

Banerjee, N. et al., "Peer-to-peer SIP-based Services over Wireless Ad Hoc Networks", BROADWIM: Broadband Wireless Multimedia Workshop, Oct. 29, 2004, 8 pages.

Das, S. et al., "SPAWN: A Swarming Protocol for Vehicular Ad-Hoc Wireless Networks", VANET '04 Proceedings, Oct. 2004, ACM, New York, NY, pp. 93-94.

Evans, B.G. et al., "Visions of 4G", Electronics & Communication Engineering Journal, Dec. 2000, vol. 2, Issue 6, IEEE, Piscataway, NJ, pp. 293-303.

Frattasi, S., "Defining 4G Technology from the User's Perspective", IEEE Network, Jan./Feb. 2006, vol. 20, Issue 1, IEEE Communications Society, Piscataway, NJ, pp. 35-41.

Goode, B., "Voice Over Internet Protocol (VoIP)", Proceedings of the IEEE Sep. 2002, vol. 90, No. 9, IEEE, Piscataway, NJ, pp. 1495-1517.

Kellerer, W. et al., "(Auto) Mobile Communication in a Heterogeneous and Converged World," IEEE Personal Communications, Dec. 2001, vol. 8, Issue 6, IEEE Communications Society, Piscataway, NJ, pp. 41-47.

(56) References Cited

OTHER PUBLICATIONS

Kellerer, W. et al., "A Communication Gateway for Infrastructure Independent 4G Wireless Access", IEEE Communications Magazine, Mar. 2002, vol. 9, No. 3, IEEE Communications Society, Piscataway, NJ, pp. 126-131.
Lee, K. et al., "Architecture to be Deployed on Strategies of Next-Generation Networks", ICC '03, IEEE International Conference on Communications, May 2003, vol. 2, IEEE, Piscataway, NJ, pp. 819-822.
Lu, W. et al., "Open Wireless Architecture—The Core to 4G Mobile Communications", China Communications, Apr. 2006, pp. 32-39.
Pabst, R. et al., "Relay-Based Deployment Concepts for Wireless and Mobile Broadband Radio", IEEE Communications Magazine, Sep. 2004, vol. 42, Issue 9, IEEE Communication Society, Piscataway, NJ, pp. 80-89.
Tseng, Y. et al., "Integrating Mobile IP with Ad Hoc Networks", Computer, May 2003, vol. 36, Issue 5, IEEE Computer Society, Piscataway, NJ, pp. 48-55.
Wei, H. et al., "Two-Hop-Relay Architecture for Next-Generation WWAN/WLAN Integration", IEEE Wireless Communications, Apr. 2004, vol. II, Issue 2, IEEE Computer Society, Piscataway, NJ, pp. 24-30.
Woerner, B. et al., "Research Directions for Fourth Generation Wireless", Proceedings of the 10th IEEE International Workshops on Enabling Technologies: Infrastructure for Collaborative Enterprises (WETICE 2001), 2001, IEEE Computer Society, pp. 60-61.
Yanikomeroglu, H. et al., "Coverage Enhancement Through Two-Hop Peer-to-Peer Relaying in Cellular Radio Networks", WWRF Meeting #7 Elindhoven, the Netherlands, Dec. 3-4, 2002, 10 pages.
Yu, W. et al., "Reverse Link Capacity Analysis on Distributed Wireless Communication System", Journal of Beijing University of Posts and Telecommunications, Jun. 30, 2004, 4 pages.
Extended European Search Report for European Application No. 05801092.7-1525/1810465, PCT/US05/035648 mailed Jan. 31, 2011, 72 pages.
Notification of the First Office Action for United Kingdom Application No. GB0706179.9 mailed Sep. 18, 2008, 3 pages.
First Examination Report for Indian Application No. 469/MUMNP/2007, dated Mar. 30, 2013, 3 pages.
International Report on Patentability and Written Opinion of the International Search Authority for International Application No. PCT/US05/35648 from the International Searching Authority, mailed on Aug. 24, 2006, 8 pages.
International Search Report and Written Opinion of the International Search Authority for International Application No. PCT/US09/045951 from the International Searching Authority, mailed on Dec. 30, 2009, 8 pages.
International Search Report and Written Opinion of the International Search Authority for International Application No. PCT/US09/045968 from the International Searching Authority, mailed on Jan. 21, 2010, 9 pages.
International Search Report and Written Opinion of the International Search Authority for International Application No. PCT/US09/045973 from the International Searching Authority, mailed on Jan. 18, 2010, 10 pages.

* cited by examiner

|  | dMA Node Register (508) | dMA Node HLR (510) | dMA Node VLR (512) | Visitor dMA Node Register (514) | Visitor dMA Node HLR (516) | Visitor dMA Node VLR (518) |
|---|---|---|---|---|---|---|
| 502 | Home dMA Node Register | HLR of each Home dMA Node | VLR of each Home dMA Node | Visitor dMA Node Register | HLR of each Visitor dMA Node | VLR of each Visitor dMA Node |
| 504 | dMA Node Register of $2^{nd}$ dMAG | HLR of each dMA Node of $2^{nd}$ dMAG | VLR of each dMA Node of $2^{nd}$ dMAG | Visitor dMA Node Register of $2^{nd}$ dMAG | HLR of each Visitor dMA Node of $2^{nd}$ dMAG | VLR of each Visitor dMA Node of $2^{nd}$ dMAG |
| 506 | dMA Node Register of $3^{rd}$ dMAG | HLR of each dMA Node of $3^{rd}$ dMAG | VLR of each dMA Node of $3^{rd}$ dMAG | Visitor dMA Node Register of $3^{rd}$ dMAG | HLR of each Visitor dMA Node of $3^{rd}$ dMAG | VLR of each Visitor dMA Node of $3^{rd}$ dMAG |

FIG. 5

FAULT TOLERANT DISTRIBUTED MOBILE ARCHITECTURE

CLAIM OF PRIORITY

The present application claims priority from and is a continuation of U.S. patent application Ser. No. 12/163,601, filed on Jun. 27, 2008, and entitled "FAULT TOLERANT DISTRIBUTED MOBILE ARCHITECTURE," the content of which is incorporated herein by reference in its entirety.

TECHNICAL FIELD

The present disclosure relates generally to distributed mobile architecture (dMA) systems. More specifically, example embodiments are directed to fault tolerance in a dMA system.

BACKGROUND

Distributed mobile architecture (dMA) enables multiple dMA nodes (e.g., each dMA node including a dMA server and one or more base transceiver stations (BTSs)) that service one or more mobile stations to be interconnected via Internet Protocol (IP) connections.

This interconnectivity defines a dMA network in which voice and data calls to and from the one or more mobile stations may be switched at the edge of the dMA network (e.g., via the dMA nodes), reducing a need for backhaul of traffic to a mobile switching center (MSC) over a backhaul infrastructure that is ubiquitous in and a major contributor to high costs of the existing mobile networks.

A dMA gateway (dMAG) may be employed in the dMA network to provide switching of voice and data calls to and from one or more of the plural legacy networks, including public switch telephone networks (PSTNs), IP networks, other wireless systems, and the like, while keeping the edge-switching efficiencies of the dMA network.

A failure in the operation of the dMAG or the dMAG going offline disrupts continuity of service between the one or more mobile stations and the one or more of the plural legacy networks. In the case of the dMAG failing or otherwise going offline, the dMA nodes associated with the failed or offline dMAG may experience a disruption in servicing the communication of the associated one or more mobile stations with the plural legacy networks.

BRIEF DESCRIPTION OF THE DRAWINGS

Some embodiments are illustrated by way of example and not limitation in the figures of the accompanying drawings in which:

FIG. 5 illustrates a table showing example data associated with a dMAG, in accordance with FIGS. 2-4;

DETAILED DESCRIPTION

Figure 1:
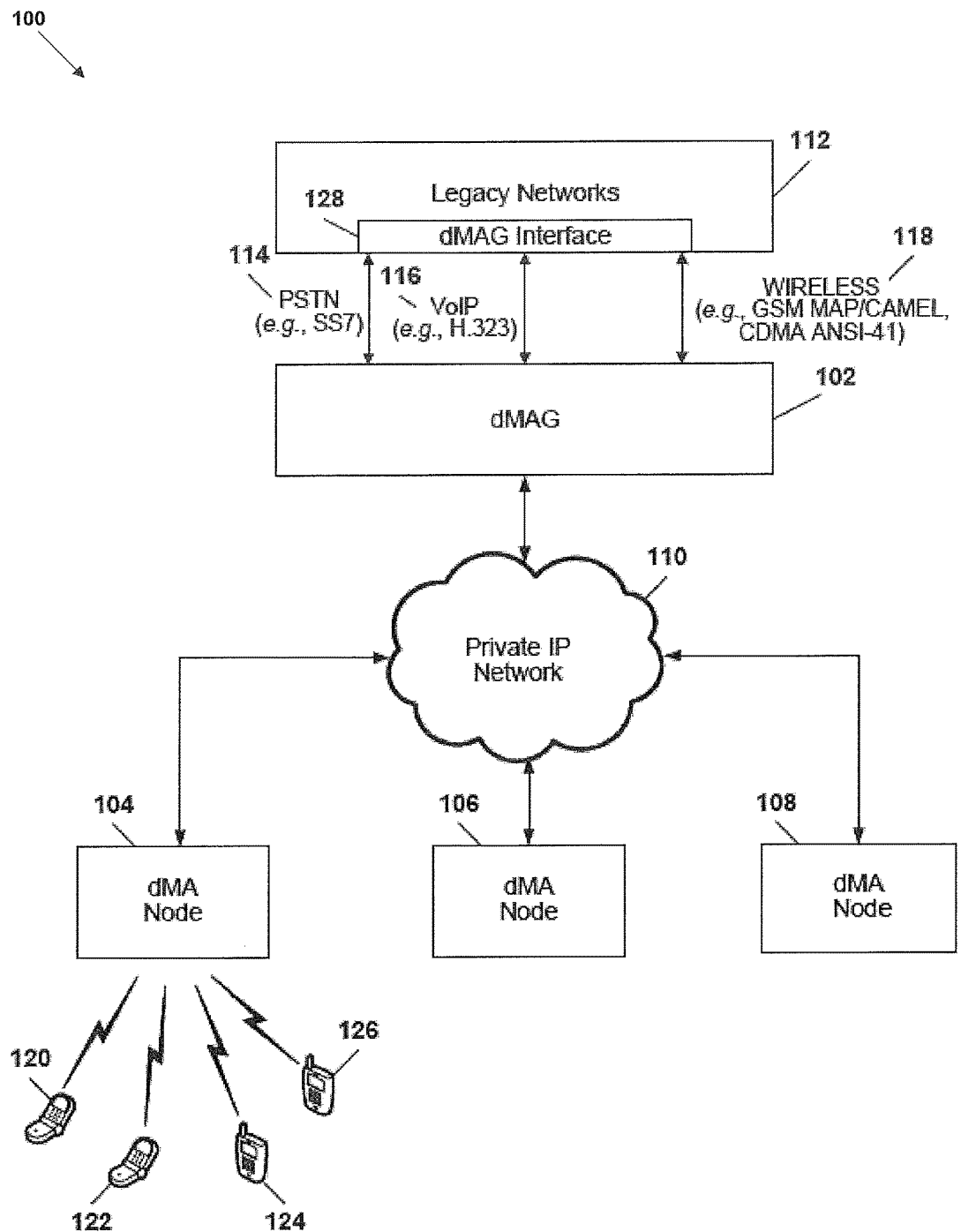
FIG. 1 is a block diagram of an example distributed mobile architecture (dMA) network that includes a dMA gateway (dMAG), which provides one or more of plural dMA nodes with service to one or more of plural legacy networks.

An example method, system and machine-readable storage medium are described for providing fault tolerance in a distributed mobile architecture (dMA) system.

In accordance with an embodiment, there is provided a method for providing fault tolerance in a distributed mobile architecture (dMA) system, the method comprising: receiving a message or failing to receive the message within a predetermined time relating to a first dMA gateway (dMAG) at a second dMAG; determining that the first dMAG is not operational or is otherwise offline based on the received message or the failure to receive the message; notifying one or more dMA nodes associated with the first dMAG to request connections to an external system via the second dMAG; and notifying the external system to request connections to one or more dMA nodes associated with the first dMAG via the second dMAG.

In accordance with another embodiment, there is provided a method for providing fault tolerance in a distributed mobile architecture (dMA) system, the method comprising: receiving a connection request at a dMA node to connect an outgoing call from a mobile station; transmitting a first connection request message from the dMA node to a first dMA gateway (dMAG) to connect the outgoing call to an external system based on the received connection request; determining a failure to connect the outgoing call via the first dMAG; determining a second operational dMAG to connect the outgoing call; and transmitting a second connection request message from the dMA node to the second dMAG to connect the outgoing call to an external system based on the received connection request.

In accordance with a further embodiment there is provided, a method for providing fault tolerance in a distributed mobile architecture (dMA) system, the method comprising: receiving a connection request at a dMA gateway (dMAG) interface to connect an outgoing call from a subscriber of a legacy system; transmitting a first connection request message from the dMAG interface to a first dMAG to connect the outgoing call to a dMA node associated with a mobile station to which the outgoing call is directed based on the received connection request; determining a failure to connect the outgoing call via the first dMAG; determining a second operational dMAG to connect the outgoing call; and transmitting a second connection request message from the dMAG interface to the second dMAG to connect the outgoing call via the second dMAG to the dMA node associated with the mobile station to which the outgoing call is directed based on the received connection request.

In accordance with yet another embodiment, there is provided, a method for providing fault tolerance in a distributed mobile architecture (dMA) system, the method comprising: receiving a message or failing to receive the message within a predetermined time relating to a first dMA gateway (dMAG) at dMAG management system; determining that the first dMAG is not operational or is otherwise offline based on the received message or the failure to receive the message; selecting an operational second dMAG; and notifying the second dMAG that it is to take over the operation of the first dMAG.

In accordance with an embodiment, there is provided a fault tolerant distributed mobile architecture (dMA) system, the system comprising: a second dMA gateway (dMAG). The second dMA gateway includes a message receipt module to receive a message or to determine the failure to receive the message within a predetermined time relating to a first dMAG; an operation determination module to determine that the first dMAG is not operational or is otherwise offline based on the received message or the failure to receive the message; and a notification module to notify one or more dMA nodes associated with the first dMAG to request connections to an external system via the second dMAG, the notification module further to notify the external system to request connections to one or more dMA nodes associated with the first dMAG via the second dMAG.

In accordance with another embodiment, there is provided a fault tolerant distributed mobile architecture (dMA) system, the system comprising: a connection request module to receive a connection request to connect an outgoing call from a mobile station; transmit a first connection request message to a first dMA gateway (dMAG) to connect the outgoing call to an external system based on the received connection request; determine a failure to connect the outgoing call via the first dMAG; and transmit a second connection request message to a second dMAG to connect the outgoing call to an external system based on the received connection request; and a dMAG determination module to determine the second operational dMAG to connect the outgoing call.

In accordance with a further embodiment, there is provided a fault tolerant distributed mobile architecture (dMA) system, the system comprising: a connection request module to receive a connection request to connect an outgoing call from a subscriber of a legacy system; transmit a first connection request message to a first dMAG to connect the outgoing call to a dMA node associated with a mobile station to which the outgoing call is directed based on the received connection request; determining a failure to connect the outgoing call via the first dMAG; transmitting a second connection request message to a second dMAG to connect the outgoing call via the second dMAG to the dMA node associated with the mobile station to which the outgoing call is directed based on the received connection request; and a dMAG determination module to determine a second operational dMAG to connect the outgoing call.

In accordance with yet another embodiment, there is provided a fault tolerant distributed mobile architecture (dMA) system, the system comprising: an operation determination module to: receive a message or failing to receive the message within a predetermined time relating to a first dMA gateway (dMAG); and determine that the first dMAG is not operational or is otherwise offline based on the received message or the failure to receive the message; a dMAG selection module to select an operational second dMAG; and a notification module to notify the second dMAG that it is to take over the operation of the first dMAG.

FIG. 1 is a block diagram of an example distributed mobile architecture (dMA) network 100 that includes a dMA gateway (dMAG) 102, which provides one or more of plural dMA nodes 104, 106 and 108 with service to one or more of plural legacy networks 112. Each of the dMA nodes 104, 106, 108 may include a dMA server and one or more base transceiver stations (BTSs), which are not shown for clarity and brevity, to provide cellular coverage site(s) to one or more mobile stations 120, 122, 124, 126. The dMA node 104 (via dMA server) may hand-off of and switch calls between BTSs that are associated with the dMA node 104. The dMA node 104 (via dMA server) may further provide hand-off of calls and switch calls made between a BTS associated with dMA node 104 and BTS associated with another dMA node, such as dMA node 106, 108. Other dMA nodes 106, 108 may operate similarly to dMA node 104 described above to provide switching and hand-offs. It should be noted that the number of dMA nodes 104, 106, 108 represents only one example and the number of dMA nodes may be varied depending on the requirements of the dMA network 100.

The dMA nodes 104, 106, 108 are interconnected to each other via a private IP network 110, such as via peer-to-peer connections, to provide for the switching and hand-off efficiencies between the dMA nodes 104, 106, 108 in the dMA network 100. The connections of dMA nodes 104, 106, 108 to the private IP network 110 may be a wired or wireless. The dMA nodes 104, 106, 108 are also interconnected to the dMAG 102 via the private IP network 110 to provide switching of calls between the legacy networks 112 and the dMA nodes 104, 106, 108. In turn the legacy networks are interconnected to the dMAG via a dMAG interface 128. The dMAG interface 128 directs call traffic between the legacy networks 112 and the dMAG 102. The connection of the dMAG 102 to the dMAG interface 128 may also be wired or wireless.

The dMAG 102 is associated with plural dMA nodes 104, 106, 108 and controls switching of calls between the legacy networks 112 and the dMA nodes 104, 106, 108 to provide the one or more mobile stations associated with the respective dMA nodes service to and from the legacy networks 112. The legacy networks 112 may include a public switch telephone network (PSTN), an Internet Protocol (IP) network, one or more wireless networks, and the like. As an example, call between the dMA network 100 and the PSTN network may utilize Signaling System #7 (SS7) 114, calls between the dMA network and the IP network may utilize VoIP (11.323) 116 to set up calls, and calls between the dMA network 100 and the one or more wireless networks may utilize MAP/CAMEL (GSM and WCDMA), ANSI-41 (AMPS, IS-136 (TDMA) and CDMA), and the like 118.

Figure 2:
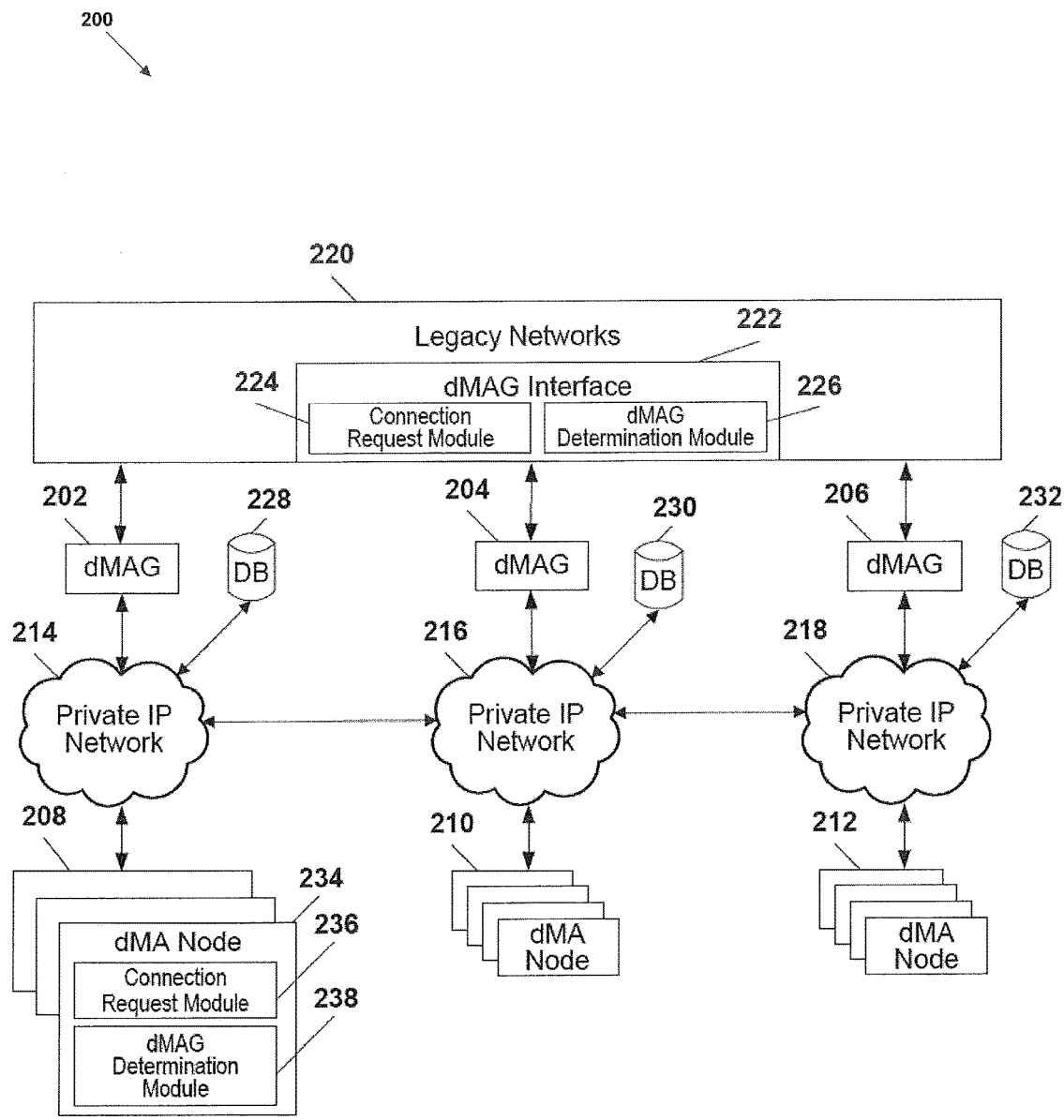
FIG. 2 is a block diagram of an example embodiment of a dMA network that includes plural dMAGs that provide fault tolerance to the dMA network.

FIG. 2 is a block diagram of an example embodiment of a dMA network 200 that includes plural dMAGs 202, 204, 206 that provide fault tolerance to the dMA network 200. The dMA nodes of each dMA node group 208, 210, 212 are interconnected to each other via a respective private IP network 214, 216, 218, such as via peer-to-peer connections, and the private IP networks 214, 216, 218 are also interconnected via wired or wireless IP connections. The interconnections provide for the switching and hand-off efficiencies between the dMA nodes of the dMA node groups 208, 210, 212 in the dMA network 200. The connections of the dMA nodes in the dMA node groups 208, 210, 212 to respective private IP networks 214, 216, 218 may likewise be a wired or wireless. An example dMA node 234 includes a connection request module 236 that transmits a connection request message to an associated dMAG 202 when a mobile station requests a connection to a legacy network 220 and a dMAG determination module 238 that determines an alternate dMAG (e.g., dMAG 204 or dMAG 206) that the connection request module 236 may contact if the connection request module 236 cannot connect via the dMAG 202. Other dMA nodes similarly provide respective connection request modules and dMAG determination modules to facilitate mobile stations in requesting connections to the legacy networks 220.

Each of the dMAGs 202, 204, 206 is associated with and interconnected to the dMA nodes of a respective dMA node group 208, 210, 212 via a respective private IP network 214, 216, 218 to provide switching of calls between the legacy networks 220 and the dMA nodes of the respective dMA node group 208, 210, 212. It is noted that the dMA nodes of the respective dMA node groups 208, 210, 212 may be mobile and may roam between the dMAGs 202, 204, 206 of the dMA network 200. For example, dMA node 234, which is associated with and considered local to dMAG 202, may roam via private IP network 216 and may register with the dMAG 204 or the dMA node 234 may roam via private IP network 218 and may register with the dMAG 206. The legacy networks 220 are interconnected to the dMAGs 202, 204, 206 via a dMAG interface 222. The dMAG interface 222 directs call traffic between the legacy networks 220 and the dMAGs 202, 204, 206. Specifically, the dMAG interface 222 includes a connection request module 224 that may transmit a connection request message from the legacy networks 220 to a dMAG (e.g., dMAG 202) for connection to an associated dMA node (e.g., dMA node 234) that is associated with a receiving mobile station (e.g., mobile station 120 shown in FIG. 1). The dMAG interface 222 further includes a dMAG determination module 226 that may determine an alternate dMAG (e.g., dMAG 204 or dMAG 206) if the connection request module 224 cannot connect via the dMAG 202. The connection of the dMAGs 202, 204, 206 to the dMAG interface 222 may also be wired or wireless.

Each dMAG 202, 204, 206 is also associated with a respective database 228, 230, 232, each of which may maintain information to enable the respective dMAG 202, 204, 206 to switch calls between the legacy networks 220 and the dMA nodes of the respective dMA node group 208, 210, 212. That is, a dMAG 202, 204, 206 may access a respective database 228, 230, 232 to obtain information used to connect calls between the legacy networks 220 and the dMA nodes of the dMA node groups 208, 210, 212. Example information that may be maintained in the respective databases 228, 230, 232 may include a dMA register, a home location register (HLR), a visitor location register (VLR), and the like. Example information maintained by the databases 228, 230, 232 will be described in greater detail below with reference to FIG. 5.

In accordance with the operation of the example embodiment of FIG. 2, the dMAGs 202, 204, 206 provide fault tolerance to the dMA network 200. More specifically, when an operational dMAG (e.g., dMAG 204 or dMAG 206) determines that a certain dMAG (e.g., dMAG 202) has failed (is non-operational) or is otherwise offline as described below, the operational dMAG (e.g., dMAG 204 or dMAG 206) may take over the operation of the failed or offline dMAG (e.g., dMAG 202) to provide connection of calls between the legacy networks 220 and the dMA nodes of the dMA node group (e.g., dMA node group 208) associated with the failed or otherwise offline dMAG (e.g., dMAG 202).

A dMAG (e.g., dMAG 204 or dMAG 206) may determine that a certain dMAG (e.g., dMAG 202) has failed by receiving a connection request from a dMA node of a certain dMA node group (e.g., dMA node 234 of dMA node group 208) resulting from a failure of the dMA node to connect an outgoing call to the legacy network 220 via an associated dMAG (e.g., dMAG 202). The failure may result from the dMA node 234 of the dMA node group 208 timing out due to non-response from the associated dMAG 202. When the connection request module 236 fails to connect to a dMAG (e.g., dMAG 202), the dMAG determination module 238 determines an alternate dMAG (e.g., dMAG 204 or dMAG 206) that the connection request module 236 should contact when the dMAG is determined to be not operational or is otherwise offline.

In addition, after a failure of a dMAG (e.g., dMAG 202) to connect an outgoing call to the legacy network 220, the dMA node 234 may roam via private IP network 216 and may register with dMAG 204 (or the dMA node 234 may roam via private IP network 218 and may register with dMAG 206). In registering the roaming dMA node 234, the dMAG 204 (or DMAG 206) may determine that the dMAG 202 is not operational or is otherwise offline.

A dMAG (e.g., dMAG 204 or dMAG 206) may further determine that a certain dMAG (e.g., dMAG 202) has failed by receiving a connection request from the dMAG interface 222 via the connection request module 224, which upon trying to connect an incoming call from one of the legacy networks 220 to a dMA node of a certain dMA node group (e.g., dMA node group 208) associated with a certain dMAG (e.g., dMAG 202) has timed out due to non-response from the associated dMAG. When the connection request module 224 fails to connect to the dMAG (e.g., dMAG 202), the dMAG determination module 226 determines an alternate dMAG (e.g., dMAG 204 or dMAG 206) that the connection request module 224 should contact when the dMAG is not operational or is otherwise offline.

In addition, one or more of the dMAGs may periodically send to one or more of the other dMAGs a heartbeat message that indicates whether the dMAGs are operational. For example, the dMAG 202 may send a periodic heartbeat message to the dMAG 204 or the dMAG 206 to indicate to the dMAGs 204 or the 206 that the dMAG 202 is operational. In the case of non-receipt of the periodic heartbeat message, the dMAG 204 or the dMAG 206 may determine that the dMAG 202 is not operational or is otherwise offline. The other dMAGs 204, 206 may similarly send periodic heartbeat messages as described. In an alternate embodiment, a dMAG (e.g., the dMAGs 204 or the 206) may poll another dMAG (e.g., dMAG 202) via one or more periodic polling messages to determine whether that other dMAG is operational. If the other dMAG fails to respond to a poll message with a poll response message, it may therefore be determined that the other dMAG (e.g., dMAGs 202) is not operational.

From time to time a certain dMAG (e.g., dMAG 202) may be taken offline for replacement, repair, and the like, and may beforehand send an offline message to another operational dMAG (e.g., DMAG 204 or dMAG 206) to take over its operation. In the case of receiving an offline message from, for example, dMAG 202, dMAG 204 or dMAG 206 may then determine that the dMAG 202 is offline.

In the particular case of requests for connection, the operational dMAG connects the calls between the dMA node of a dMA node group associated with the failed dMAG and the legacy networks 220. For all cases, after a dMAG (e.g., dMAG 204 or dMAG 206) determines that a certain dMAG (e.g., dMAG 202) has failed or is otherwise offline, the operational dMAG notifies the dMA nodes of a certain dMA node group (e.g., DMA node group 208) associated with the failed or otherwise offline dMAG (e.g., dMAG 202)

and the dMAG interface 222 of the legacy networks 220 to connect any calls between dMA nodes of that certain dMA node group (e.g., DMA node group 208) and the legacy networks 220 via the operational dMAG (e.g., dMAG 204 or dMAG 206) that has taken over the operation of the failed or offline dMAG (e.g., dMAG 202).

The operational dMAG (e.g., dMAG 204 or dMAG 206) connects calls between dMA nodes of the dMA node group 208 associated with the failed or otherwise offline dMAG 202 and the legacy networks 220 via IP network 214 and IP network 216 (dMAG 204) and additionally IP network 218 (dMAG 206). For example, when a mobile station requests a certain dMA node of the dMA node group 208 associated with failed or otherwise offline dMAG 202 to connect a call to the legacy networks 220, that certain dMA node sends a request for connection to dMAG 204 via IP networks 214, 216 or to dMAG 206 via LP networks 214, 216, 218. Likewise, when a request for connection to a certain dMA node of the dMA node group 208 is received from the legacy networks 220 at the dMAG interface 222, the dMAG interface 222 transmits the request for connection to dMAG 204, which connects the call via IP networks 214, 216, or to or DMAG 206, which connects the call via IP networks 214, 216, 218.

Figure 3:
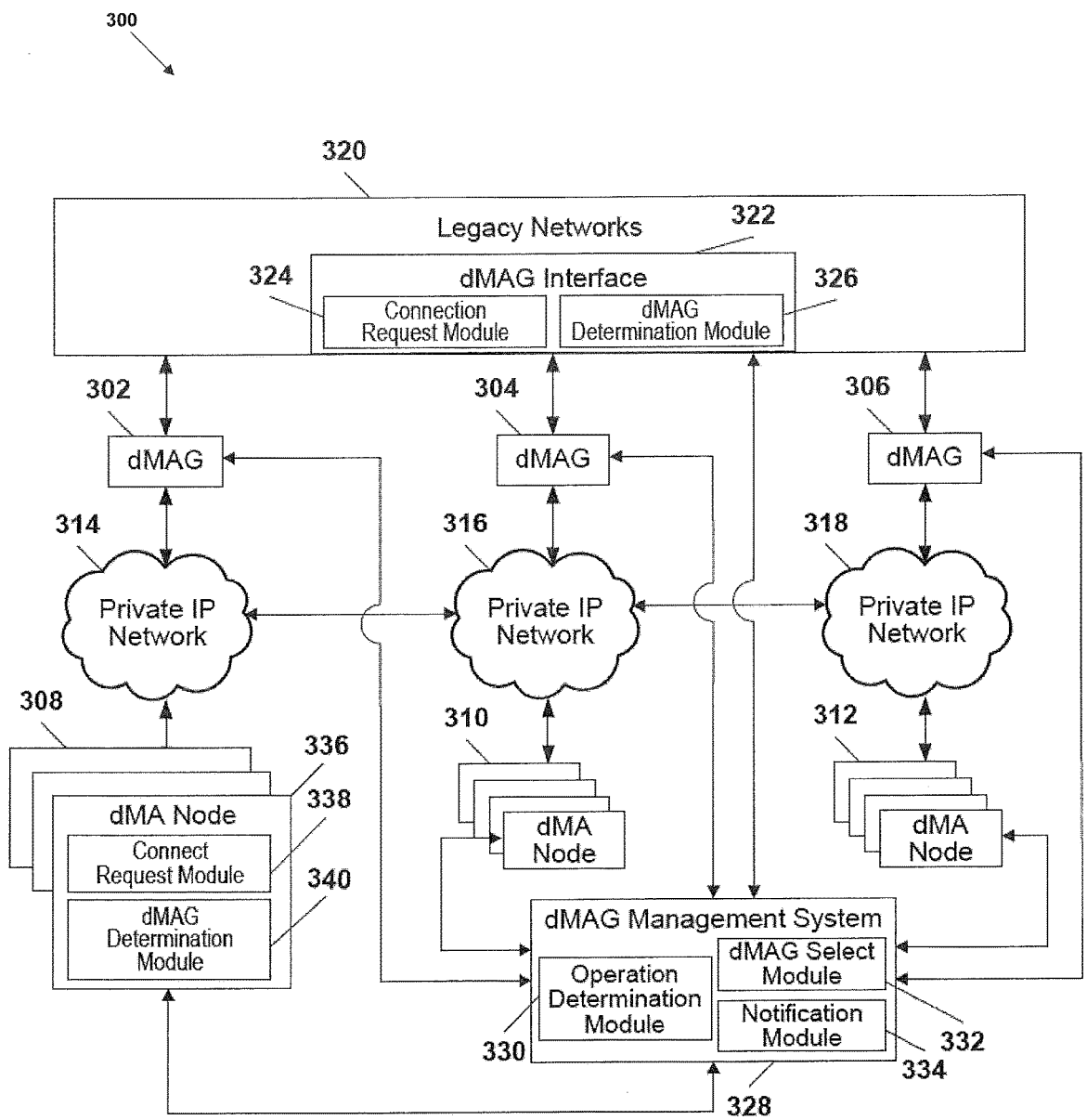
FIG. 3 is a block diagram of another example embodiment of a dMA network that includes a dMAG monitoring system to manage the plural dMAGs in providing fault tolerance to the dMA network.

FIG. 3 is a block diagram of another example embodiment of a dMA network 300 that includes a dMAG management system 328 to manage the plural dMAGs 302, 304, 306 in providing fault tolerance to the dMA network 300. The dMA nodes of each dMA node group 308, 310, 312 are interconnected to each other via a respective private IP network 314, 316, 318, such as via peer-to-peer connections, and the private IP networks 314, 316, 318 are also interconnected via wired or wireless IP connections. The interconnections provide for the switching and hand-off efficiencies between the dMA nodes of the dMA node groups 308, 310, 312 in the dMA network 300. The connections of the dMA nodes in the dMA node groups 308, 310, 312 to respective private IP networks 314, 316, 318 may likewise be a wired or wireless. An example dMA node 336 includes a connection request module 338 that transmits a connection request message to an associated dMAG 302 when a mobile station requests a connection to the legacy networks 320 and a dMAG determination module 340 that determines an alternate dMAG (e.g., dMAG 204 or dMAG 206) that the connection request module 338 may contact if the connection request module 338 cannot connect via the dMAG 302. The dMAG determination module 340 determines the alternate dMAG (e.g., dMAG 304 or dMAG 306) by contacting a dMAG management system 328. Other dMA nodes similarly provide respective connection request modules and dMAG determination modules to facilitate their associated mobile stations in requesting connections to the legacy networks 320.

Each of the dMAGs 302, 304, 306 is associated with and interconnected to the dMA nodes of a respective dMA node group 308, 310, 312 via a respective private IP network 314, 316, 318 to provide switching of calls between the legacy networks 320 and the dMA nodes of the respective dMA node group 308, 310, 312. The legacy networks 320 are interconnected to the dMAGs 302, 304, 306 via a dMAG interface 322. The dMAG interface 322 directs call traffic between the legacy networks 320 and the dMAGs 302, 304, 306. Specifically, the dMAG interface 322 includes a connection request module 324 that transmits a connection request message from the legacy networks 320 to a dMAG (e.g., DMAG 202) for a connection to an associated dMA node (dMA node 234) that is associated with a receiving mobile station (e.g., mobile stations 120 shown in FIG. 1).

The dMAG interface 322 further includes a dMAG determination module 326 that may determine an alternate dMAG (e.g., dMAG 304 or dMAG 306) if the connection request module 324 cannot connect via the dMAG 302 by contacting a dMAG management system 328. The connection of the dMAGs 302, 304, 306 to the dMAG interface 322 may also be wired or wireless.

Each dMAG 302, 304, 306 is interconnected to the dMAG management system 328, which manages dMAGs 302, 304, 306 in providing fault tolerance to the dMA network 300. More specifically, when the dMAG management system 328 determines that a certain dMAG (e.g., dMAG 302) has failed (is non-operational) or is otherwise offline as described below, the dMAG management system 328 may request that an operational dMAG (e.g., dMAG 304 or dMAG 306) take over the operation of the failed or offline dMAG (e.g., dMAG 302) to provide connection of calls between the legacy networks 320 and the dMA nodes of a dMA node group (e.g., dMA node group 308) associated with the failed or otherwise offline dMAG (e.g., dMAG 302).

The dMAG management system 328 includes an operation determination module 330 that determines whether a dMAG (e.g., dMAG 302) is non-operational or otherwise offline. If the operation determination module 330 determines that a dMAG (e.g., dMAG 302) is not operational or is otherwise offline, the dMAG selection module 332 selects an alternate operational dMAG (e.g., dMAG 304 or dMAG 306) to take over the operation of the failed or otherwise offline dMAG (e.g., dMAG 302). The notification module 334 notifies the selected operational dMAG (e.g., dMAG 304 or 306) that it is to provide the connection of calls between the legacy networks 320 and the dMA nodes of the dMA node group (e.g., dMA node group 308) associated with the failed or otherwise offline dMAG (e.g., dMAG 302). Upon receiving the notification, the operational dMAG (e.g., dMAG 304 or dMAG 306) notifies the dMA nodes of the dMA node group (e.g., dMA node group 308) associated with the failed or otherwise offline dMAG (e.g., dMAG 302) to send connection request messages for connection to the legacy networks 320 to the selected operational dMAG (e.g., dMAG 304 or 306) that has taken over the operations for the failed or otherwise offline dMAG (e.g., dMAG 302). The operational dMAG (e.g., dMAG 304 or dMAG 306) further notifies the dMAG interface 322 to send connection request messages for connection via the failed or otherwise offline dMAG 302 to the selected operational dMAG 304 or 306.

The dMAG management system 328 via operation determination module 330 may determine that a certain dMAG (e.g., dMAG 302) has failed by receiving a dMAG determination message from a dMAG determination module 340 of a dMA node of a certain dMA node group (e.g., dMA node 336 of dMA node group 308) resulting from a failure of the dMA node to connect an outgoing call via an associated dMAG (e.g., dMAG 302). The failure may result from the dMA node 336 of the dMA node group 308 timing out due to non-response from the associated dMAG 302.

The dMAG management system 328 via operation determination module 330 may further determine that a certain dMAG (e.g., dMAG 302) has failed by receiving a dMAG determination message from the dMAG interface 322 via the dMAG determination module 326, after the connection request module 324 tried to connect an incoming call from the legacy networks 320 to a dMA node of a certain dMA node group (e.g., dMA node 328 of dMA node group 308)

associated with a certain dMAG (e.g., dMAG 302) and has timed out due to non-response from the associated dMAG (e.g., dMAG 302).

In addition, one or more of the dMAGs 302, 304, 306 may periodically send to a heartbeat message that indicates whether the dMAGs 302, 304, 206 are operational. For example, dMAG 302 may periodically send a heartbeat message to the dMAG management system 328 to indicate that the dMAG 302 is operational. In the case of non-receipt of the periodic heartbeat message from the dMAG (e.g., dMAG 302), the dMAG management system 328 via the operation determination module 330 may determine that the dMAG 302 is not operational. The other dMAGs 304, 306 may similarly send periodic heartbeat messages to the dMAG management system 328. In an alternate embodiment, the dMAG management system 328 (via operation determination module 330) may poll one or more of the dMAGs (e.g., dMAGs 304, 304, 306) via one or more periodic polling messages to determine whether the dMAGs are operational. If a dMAG fails to respond to a poll message with a poll response message, it may therefore be determined that the dMAG (e.g., dMAGs 202) is not operational.

From time to time a certain dMAG (e.g., dMAG 302) may be taken offline for replacement, repair, and the like, and may beforehand send an offline message to the dMAG management system 328. In the case of receiving an offline message from dMAG 302, for example, the dMAG management system 328 via operation determination module 330 may then determine that the dMAG 302 is offline.

In the particular case of the dMAG determination module 326 of dMAG interface 322 or the dMAG determination module 340 of a dMA node (e.g., dMA node 336) contacting the dMA management system 328, the operation determination module 330 determines which dMAG (e.g., dMAG 302) has failed or is otherwise offline, the dMAG selection module 332 selects an operational dMAG (e.g., dMAG 304 or dMAG 306) to take over the operation of the failed or offline dMAG (e.g., dMAG 302), and the notification module 334 notifies the dMAG determination module 326 or the dMAG determination module 340 of the selected operational dMAG (e.g., dMAG 304 or dMAG 306). The connection request module 324 of the dMAG interface 322 or the connection request module 338 of the dMA node 336 then uses the received notification of the selected operational dMAG to transmit a connection request message to the selected operational dMAG (e.g., dMAG 304 or dMAG 306) to connect a dMA node (e.g., dMA node 336) to the legacy networks 320. The dMAG management system 328 via the notification module 334 further notifies the selected operational dMAG (e.g., dMAG 304 or dMAG 306) that it is to take over the operation of the failed or offline dMAG (e.g., dMAG 302). The notified operational dMAG thereafter notifies the dMA nodes of a certain dMA node group (e.g., DMA node group 308) associated with the failed or otherwise offline dMAG (e.g., dMAG 302) and the dMAG interface 322 to connect any calls between dMA nodes of that certain dMA node group (e.g., DMA node group 308) and the legacy network 320 via the selected operational dMAG (e.g., dMAG 304 or dMAG 306).

Figure 4:
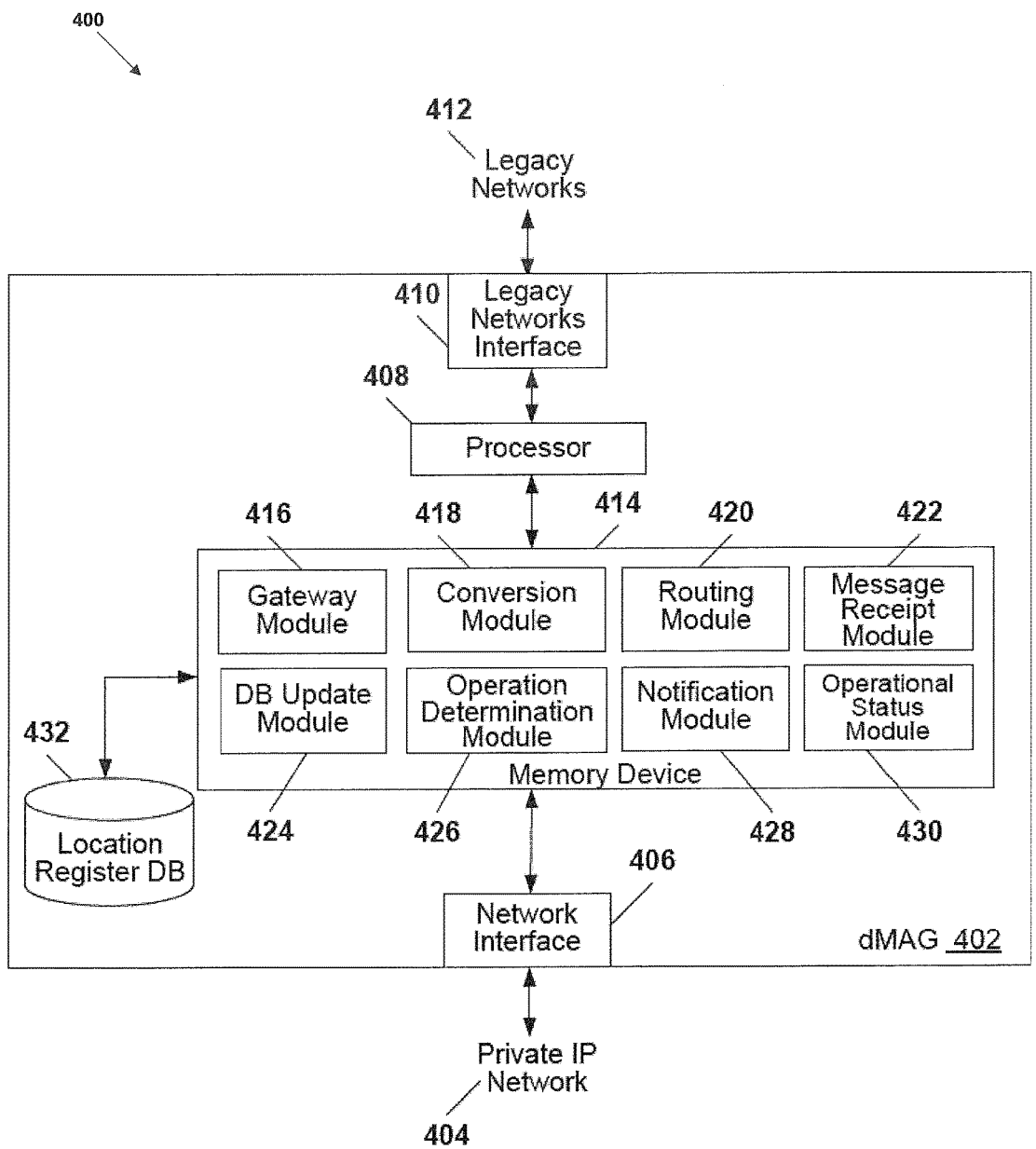
FIG. 4 is an exploded block diagram of an example dMAG in accordance with FIGS. 2 and 3.

FIG. 4 is an exploded block diagram 400 of an example dMAG 402 in accordance with FIGS. 2 and 3. The dMAG 402 includes a network interface 406 that interconnects the dMAG 402 to a private IP network 404 (e.g., private IP network 214, 216, 218, 314, 316 or 318). The dMAG 402 also includes a legacy networks interface 410 that interconnects the dMAG 402 to one or more legacy networks 412 (e.g., legacy networks 220, 320). Further, the dMAG 402 includes a processor 408 that executes one or more of the various modules 416-430 stored on a memory device 414 to provide telephony service between the private IP network 404 (e.g., IP network 214, 316, 218, 314, 316, or 318) and the legacy networks 412 (e.g., legacy networks 220, 320). The memory device 414 includes a gateway module 416, a conversion module 418, a routing module 420, a message receipt module 422, a DB update module 424, an operation determination module 426, a notification module 428, and an operational status module 430. For the example system of FIG. 3, the operation determination module 426 may be omitted, disabled or not executed as the dMAG management system 328 of FIG. 3 may perform the DMAG management functions as described herein with reference to FIG. 3 above.

Further with reference to FIG. 4, the gateway module 416 directs or controls call traffic from the private IP network 404 to the legacy networks 412 (e.g., legacy networks 220, 320) via the legacy networks interface 410. The conversion module 418 performs any conversion between Internet Protocol (IP) and the protocols associated with the legacy networks 412. The routing module 420 uses the location register database 432 to route call traffic from the legacy network 412 to the private IP network 404 via network interface 406. The message receipt module 422 may receive messages related to operational status of a dMAG from other dMAGs (e.g., dMAGs 202, 204, 206, 302, 304, and 306), dMA node groups (e.g., 208, 210, 212, 308, 310, 312), or the dMAG management system 328. The messages related to operational status may include registration messages from dMA nodes associated with the other dMAGs (e.g., dMAGs 202, 204, 206, 302, 304, and 306) requesting to register with dMAG 402. The location register database 432 maintains the dMAs and mobile stations that are registered with the dMAG 402, as will be described with reference to FIG. 5 below. The database update module 424 may periodically update the location register database 432 with data from an associated external database (e.g., database 228, 230, 232).

Still further with reference to FIG. 4, the operation determination module 426 determines whether another dMAG (e.g., dMAG 202, 204, 206, 302, 304 or 306) is non-operational or is otherwise offline as described above. The notification module 428 notifies the dMA nodes associated with the non-operational or offline dMAG and the legacy networks 412 (e.g., dMAG interface 222 or 322) to route call traffic between the legacy networks 412 and the non-operational or offline dMAG via the dMAG 402. The operational status module 430 is responsible for periodically transmitting a heartbeat message from the dMAG 402 to at least one of the other dMAGs (e.g., dMAGs 202, 204, 206, 302, 304, and 306) to indicate an operational status of the dMAG 402, such as ready or going offline, and the like. In an alternate embodiment, the operational status module 430 may transmit a polling response message in response to a polling status request message as to the operational status of the dMAG 402.

FIG. 5 illustrates a table 500 showing example data associated with a dMAG, in accordance with FIGS. 2-4. More specifically, the table 500 illustrates in a graphical format the different databases of data that may be utilized by the dMAGs of FIGS. 2-4 to provide switching or connection of calls between the legacy networks and the dMA nodes (mobile stations) of FIGS. 2-4. Depending on the size of the dMA network 200, 300 in FIGS. 2 and 3, the number of dMAGs for which data is shown in FIG. 5 may increase or decrease accordingly. The table 500 illustrates different databases 508-518 each including one or more tables for a local or 1ˢᵗ dMAG 502 (e.g., dMAG 202, 302), a 2ⁿᵈ dMAG 504 (e.g., dMAG 204, 304), and 3ʳᵈ dMAG 506 (e.g., dMAG 206, 306).

The dMA node register database 508 includes a home dMA node register (e.g., one or more database tables) that identifies the dMA nodes (e.g., dMAG nodes of dMA node group 208, 308) which are associated with the local or 1ˢᵗ dMAG 502 (e.g., dMAG 202, 302); a dMA node register (e.g., one or more database tables) of the 2ⁿᵈ dMAG 504 (e.g., dMAG 204, 304) identifies the dMA nodes (e.g., dMA nodes of the dMA node group 210, 310) associated with the 2ⁿᵈ dMAG 504; and a dMA node register (e.g., one or more database tables) of the 3ʳᵈ dMAG 506 (e.g., dMAG 206, 306) identifies the dMA nodes (e.g., dMA nodes of the dMA node group 212, 312) associated with the 3ʳᵈ dMAG 506.

The dMA node HLR database 510 includes the home location register (e.g., database tables) for each of the local or 1ˢᵗ dMAG 502 (e.g., dMAG 202, 302), the 2ⁿᵈ dMAG 504 (e.g., dMAG 204, 304) and the 3ʳᵈ dMAG 506 (e.g., dMAG 206, 306). Each home location register of the dMA node HLR database 510 includes calling information for the home mobile stations that are associated respectively with the local or 1ˢᵗ dMAG 502 (e.g., dMAG 202, 302), the 2ⁿᵈ dMAG 504 (e.g., dMAG 204, 304) and the 3ʳᵈ dMAG 506 (e.g., dMAG 206, 306).

The dMA node VLR database 512 includes the visitor location registers (e.g., database tables) for the local or 1ˢᵗ dMAG 502 (e.g., dMAG 202, 302), the 2ⁿᵈ dMAG 504 (e.g., dMAG 204, 304) and the 3ʳᵈ dMAG 506 (e.g., dMAG 206, 306). Each visitor location register of the dMA node VLR database 512 includes calling information for the visitor mobile stations that are associated respectively with the local or 1ˢᵗ dMAG 502 (e.g., dMAG 202, 302), the 2ⁿᵈ dMAG 504 (e.g., dMAG 204, 304) and the 3ʳᵈ dMAG 506 (e.g., dMAG 206, 306).

The visitor dMA node register database 514 includes a visitor dMA node register (e.g., database table) that identifies visitor dMA nodes which are associated with the local or 1ˢᵗ dMAG 502 (e.g., dMAG 202, 302); a visitor dMA node register (e.g., a database table) of the 2ⁿᵈ dMAG 504 (e.g., dMAG 204, 304) identifies visitor dMA nodes associated with the 2ⁿᵈ dMAG 504; and a dMA node register of the 3ʳᵈ dMAG 506 (e.g., dMAG 206, 306) identifies visitor dMA nodes associated with the 3ʳᵈ dMAG 506.

The visitor dMA node HLR database 516 includes the home location register (e.g., database tables) for each visitor dMA node of the local or 1ˢᵗ dMAG 502 (e.g., dMAG 202, 302), the 2ⁿᵈ dMAG 504 (e.g., dMAG 204, 304) and the 3ʳᵈ dMAG 506 (e.g., dMAG 206, 306). The home location register includes calling information for the mobile stations of each visitor dMA node that are associated respectively with the local or 1ˢᵗ dMAG 502 (e.g., dMAG 202, 302), the 2ⁿᵈ dMAG 504 (e.g., dMAG 204, 304) and the 3ʳᵈ dMAG 506 (e.g., dMAG 206, 306).

The visitor dMA node VLR database 518 includes a visitor location register (e.g., database tables) for each visitor dMA node of the local or 1ˢᵗ dMAG 502 (e.g., dMAG 202, 302), the 2ⁿᵈ dMAG 504 (e.g., dMAG 204, 304) and the 3ʳᵈ dMAG 506 (e.g., dMAG 206, 306). Each visitor location register includes calling information for the visitor mobile stations of each visitor dMA node that are associated respectively with the local or 1ˢᵗ dMAG 502 (e.g., dMAG 202, 302), the 2ⁿᵈ dMAG 504 (e.g., dMAG 204, 304) and the 3ʳᵈ dMAG 506 (e.g., dMAG 206, 306).

Figure 6:
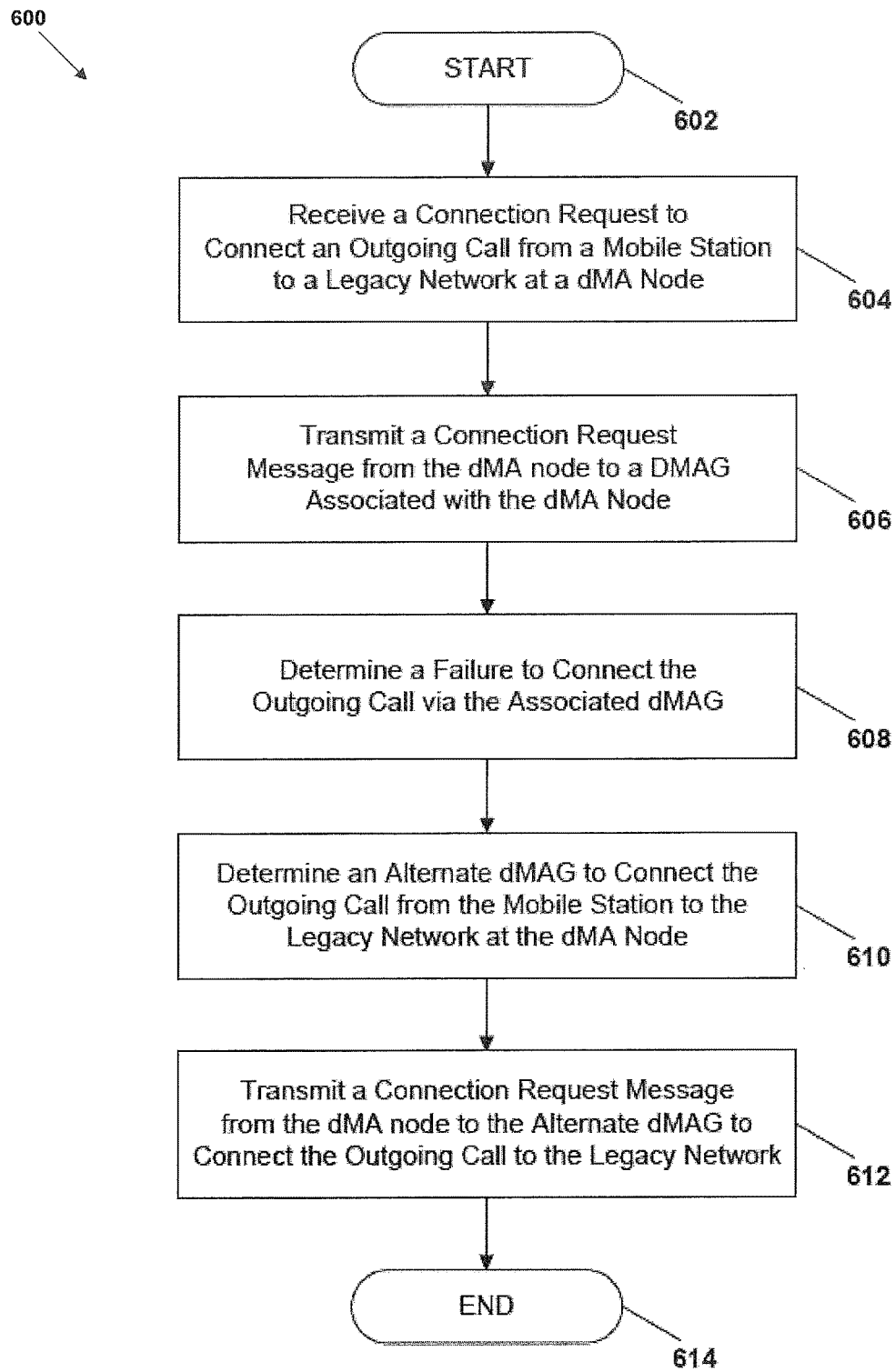
FIG. 6 is a flowchart of an example method in providing fault tolerance to the dMA network.

FIG. 6 is a flowchart of an example method 600 in providing fault tolerance to the dMA network. The method 600 begins at operation 602. At operation 604, a connection request to connect an outgoing call from a mobile station to a legacy network is received at a dMA node. In accordance with the connection request, at operation 606, the dMA node transmits a connection request message to a dMAG associated with the dMA node. At operation 608, the dMA node determines that there has been a failure to connect the outgoing call via the associated dMAG. The dMA node determines an alternate dMAG to connect the outgoing call from the mobile station to the legacy network at operation 610. Thereafter, at operation 612, the dMA node transmits a connection request message to the alternate dMAG to connect the outgoing call to the legacy network. The method ends at operation 614.

Figure 7:
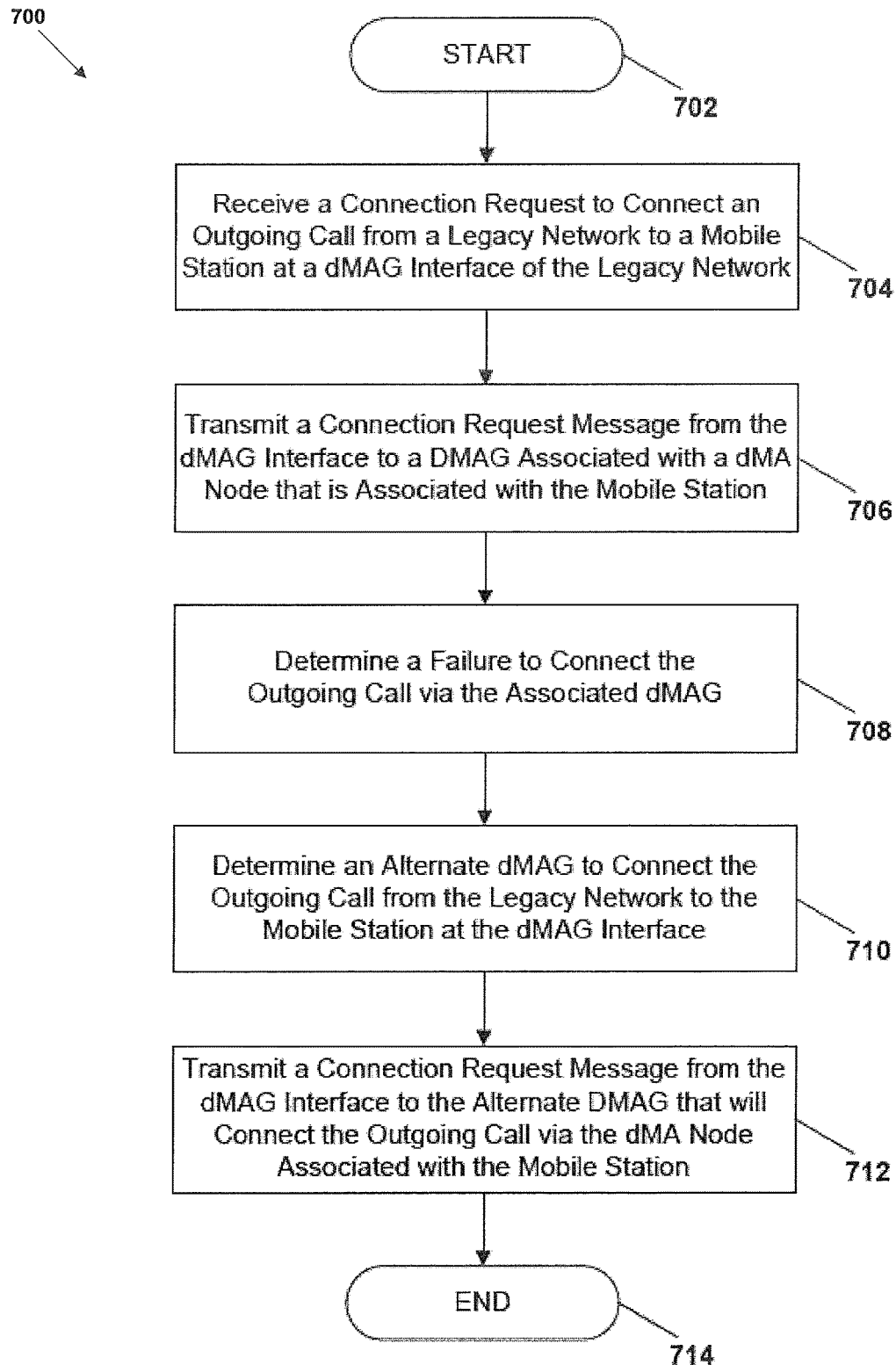
FIG. 7 is a flowchart of another example method in providing fault tolerance to the dMA network.

FIG. 7 is a flowchart of an example method 700 in providing fault tolerance to the dMA network. The method 700 begins at operation 702. At operation 704, a connection request to connect an outgoing call from a subscriber of a legacy network to a mobile station of the dMA network is received at the legacy network (via dMAG interface). In accordance with the connection request, at operation 706, the legacy network (via dMAG interface) transmits a connection request message to a dMAG associated with a dMA node that is associated with the mobile station of the dMA network. At operation 708, the legacy network (via dMAG interface) determines that there has been a failure to connect the outgoing call via the associated dMAG. The legacy network determines an alternate dMAG to connect the outgoing call from legacy network subscriber to the dMA network mobile station at operation 710. Thereafter, at operation 712, the legacy network (via dMAG interface) transmits a connection request message to the alternate dMAG to connect the outgoing call to mobile station. The method ends at operation 714.

Figure 8:
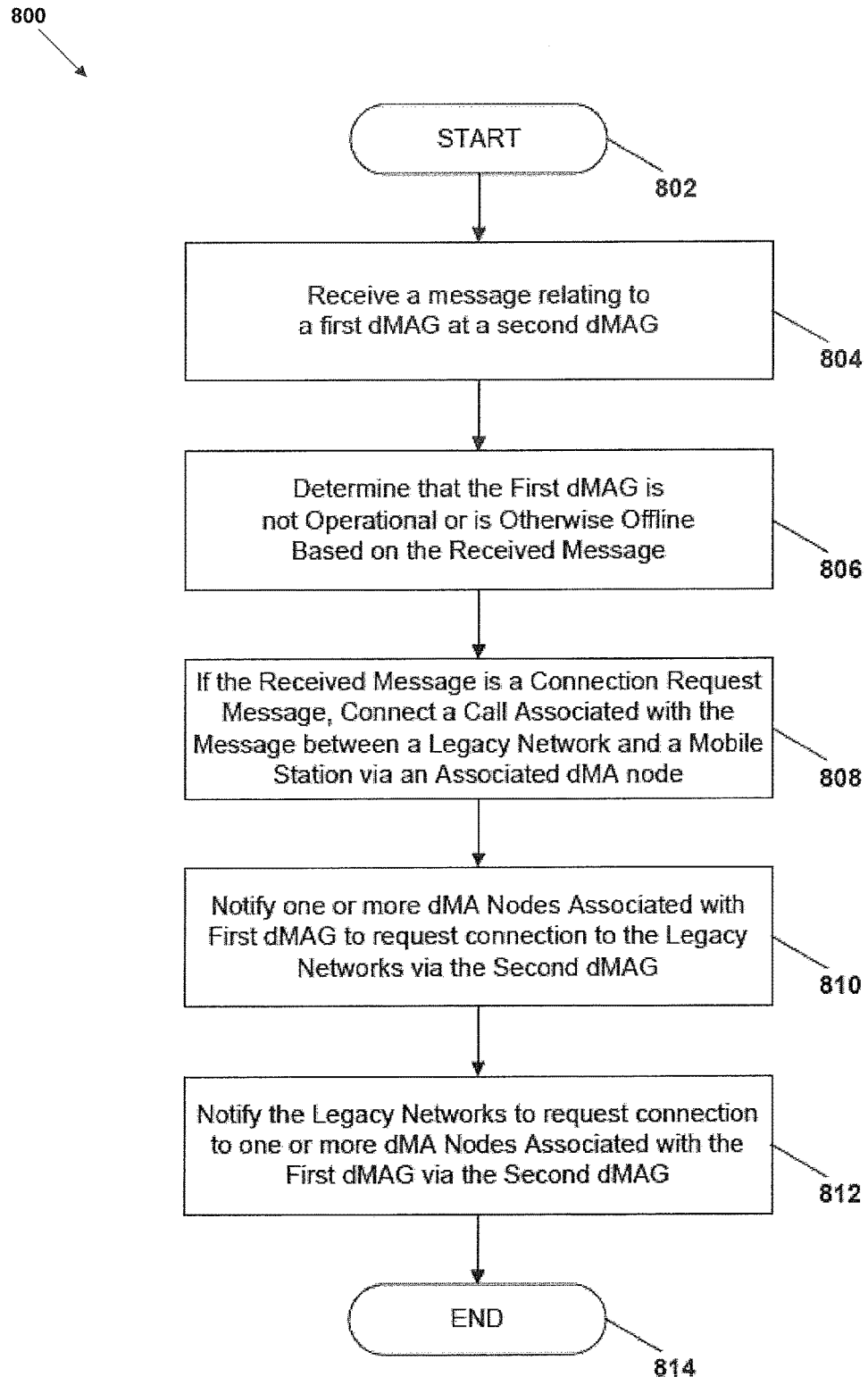
FIG. 8 is flowchart of a further example method providing fault tolerance in a dMA network.

FIG. 8 is a flowchart of an example method 800 in providing fault tolerance to the dMA network. The method 800 begins at operation 802. At operation 804, a second dMAG receives a message relating to a first dMAG. In accordance with an alternate embodiment, the second dMAG may fail to receive a message (e.g., heartbeat message) relating to the first dMAG within a prescribed time period. At operation 806, the second dMAG determines whether the first dMAG is not operational or is otherwise offline based on the received message. In an embodiment where the received message is a connection request message, the second dMAG connects a call associated with the connection request message between the legacy network and a mobile station via an associated dMA node of the dMA network at operation 808. At operation 810, the second dMAG notifies one or more the dMA nodes associated with the first dMAG to request connections to the legacy networks via the second dMAG. Thereafter, at operation 812, the second dMAG notifies the legacy networks (via dMAG interface) to request connections to one or more dMA nodes associated with the first dMAG via the second dMAG. The method 800 ends at operation 814.

Figure 9:
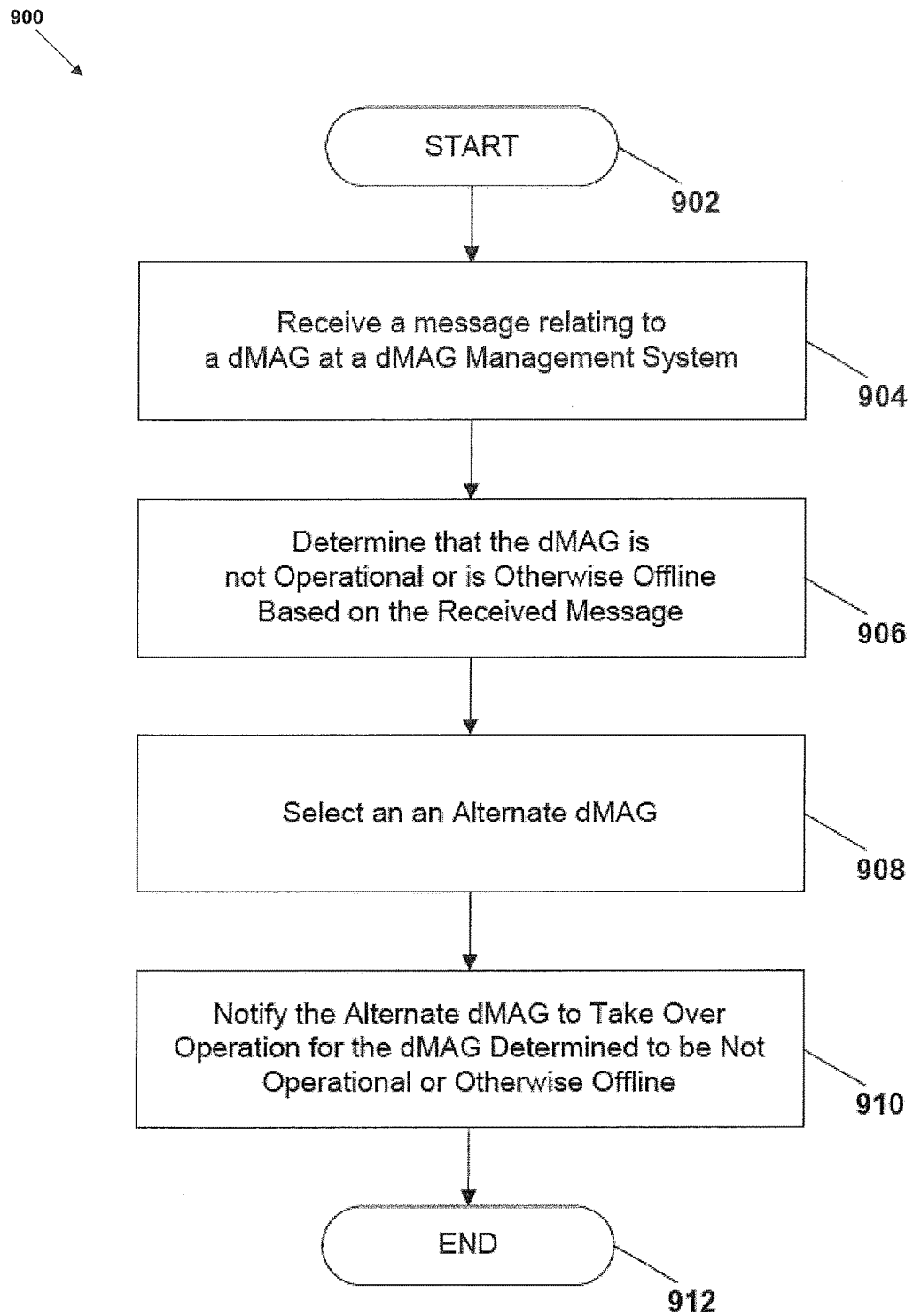
FIG. 9 is flowchart of yet another example method providing fault tolerance in a dMA network.

FIG. 9 is a flowchart of an example method 900 in providing fault tolerance to the dMA network. The method 900 begins at operation 902. At operation 904, a dMAG management system receives a message relating to a dMAG. In accordance with an alternate embodiment, the dMAG management system may fail to receive a message (e.g., heartbeat message) relating to the dMAG within a prescribed time period. At operation 906, the dMAG management system determines that the dMAG is not operational or is otherwise offline based on the received message. At operation 908, the dMAG management system selects an alternate dMAG. Thereafter, at operation 910, the dMAG management system transmits a message to the alternate dMAG, notifying the alternate dMAG to take over the operation for the dMAG determined to be not operational or otherwise offline. The alternate dMAG performs the method 800 of FIG. 8 in processing this message. The method 900 ends at operation 912.

Figure 10:
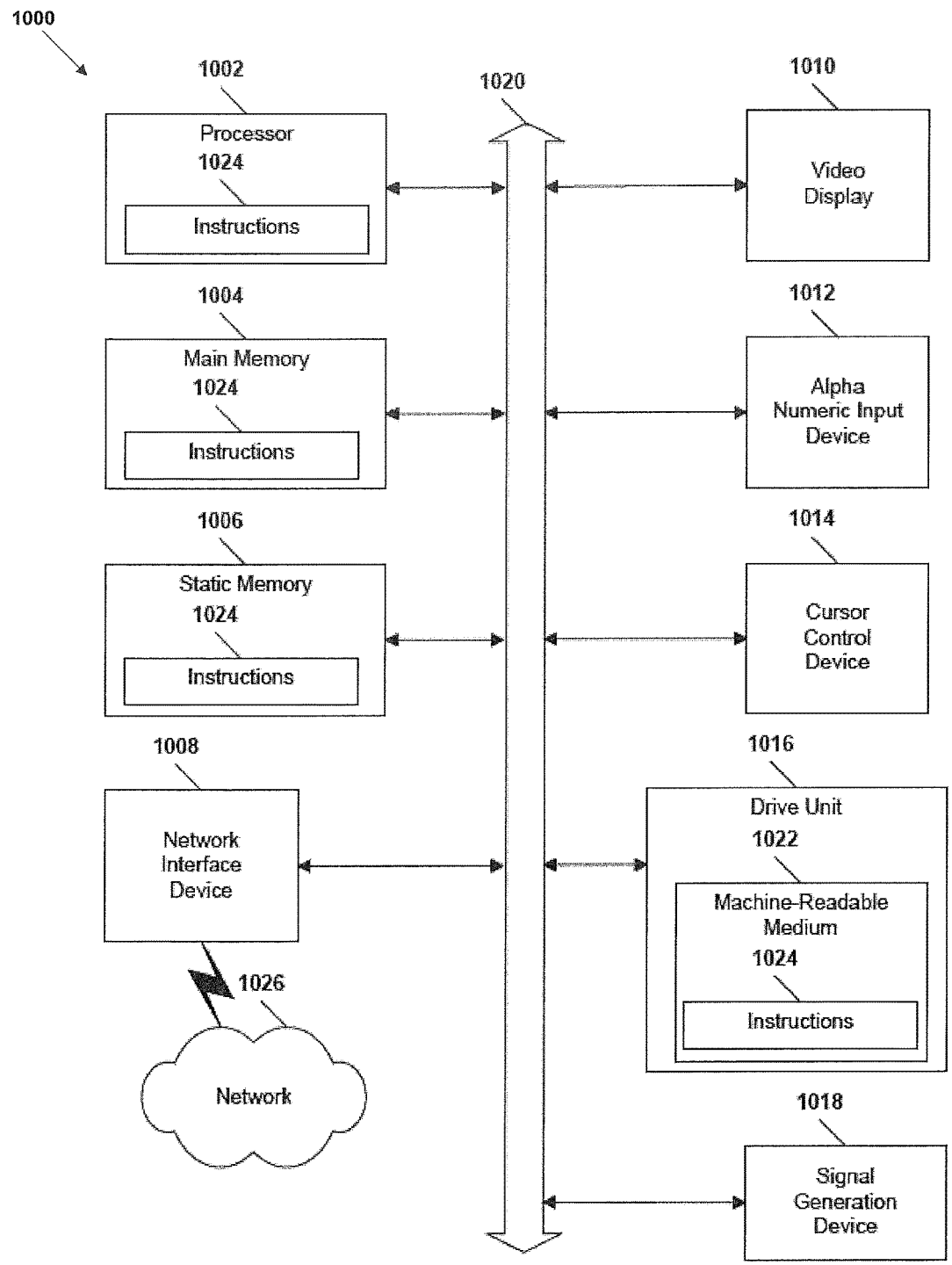
FIG. 10 is a block diagram illustrating an example computer system within which a set of instructions, for causing the computer system to perform any one or more of the methodologies disclosed in FIGS. 1-9, may be executed.

FIG. 10 is a block diagram illustrating an example machine in the example form of a computer system 1000 within which a set of instructions, for causing the computer system to perform any one or more of the methodologies disclosed in FIGS. 1-9, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1020. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1008.

The disk drive unit 1016 includes a machine-readable medium 1022 on which is stored one or more sets of instructions and data structures (e.g., software 1024) embodying or utilized by any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1008 utilizing any one of a number of well-known transfer protocols (e.g., HTTP).

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although specific example embodiments have been described, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the following description, for purposes of explanation, numerous specific details are set forth in order to provide a thorough understanding of an embodiment of the present disclosure. It will be evident, however, to one skilled in the art that the present disclosure may be practiced without these specific details.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    detecting a failure condition associated with a first distributed mobile architecture (dMA) gateway (dMAG) at a dMAG management system, wherein the dMAG management system is in communication with at least the first dMAG, a second dMAG, and a plurality of dMA nodes;
    in response to detecting the failure condition, sending a first notification from the dMAG management system to the second dMAG, wherein the first notification instructs the second dMAG to take over operations from the first dMAG;
    sending a second notification from the dMAG management system to a dMA node of the plurality of dMA nodes, the dMA node configured to connect a call from a mobile station to an external system via the first dMAG, wherein the second notification indicates that the second dMAG has taken over the operations from the first dMAG and instructs the dMA node to connect calls from the mobile station to the external system via the second dMAG; and sending a third notification from the dMAG management system to the external system, wherein the third notification instructs the external system to connect subsequent calls to the mobile station via the second dMAG.

2. The method of claim 1, wherein the failure condition is detected in response to receiving a message from the first dMAG, wherein the message indicates that the first dMAG is going offline.

3. The method of claim 1, wherein the failure condition is detected based on a message received from a particular dMA node local to the first dMAG, the message indicating failure of the first dMAG.

4. The method of claim 3, further comprising notifying the dMA node that the second dMAG is to take over the operations from the first dMAG.

5. The method of claim 1, wherein the failure condition is detected based on a message received from a dMAG interface of the external system, the message indicating failure of the first dMAG.

6. The method of claim 1, wherein the failure condition is detected in response to failing to receive a periodic heartbeat message from the first dMAG at the dMAG management system.

7. A system comprising:
a distributed mobile architecture (dMA) gateway (dMAG) management system comprising:
an operation determination module configured to:
receive messages; and
detect a failure condition associated with a first dMAG;
a dMAG selection module configured to select a second dMAG in response to detecting the failure condition; and
a notification module configured to:
send a first notification to the second dMAG, wherein the first notification instructs the second dMAG to take over operation of the first dMAG;
send a second notification to a dMA node configured to connect a call from a mobile station to an external system via the first dMAG, wherein the second notification indicates that the second dMAG has taken over the operations from the first dMAG and instructs the dMA node to connect calls from the mobile station to the external system via the second dMAG; and
send a third notification to the external system, wherein the third notification instructs the external system to connect calls to the mobile station via the second dMAG.

8. The system of claim 7, further comprising a processor and a memory, wherein the operation determination module, the dMAG selection module, and the notification module correspond to instructions stored in the memory and executable by the processor.

9. The system of claim 7, wherein the operation determination module is further configured to detect the failure condition based on a message received from the first dMAG, wherein the message is an offline message that indicates the first dMAG is going offline.

10. The system of claim 7, wherein the operation determination module is further configured to detect the failure condition based on a message received from a from the dMA node.

11. The system of claim 7, wherein the operation determination module is further configured to detect the failure condition based on a message received from the external system, and wherein the message indicates failure of the first dMAG.

12. A machine-readable storage device storing instructions that, when executed by a processor, cause the processor to perform operations comprising:
detecting a failure condition associated with a first dMA gateway (dMAG) at a dMAG management system, wherein the dMAG management system is in communication with at least the first dMAG, a second dMAG, and a plurality of dMA nodes;
in response to detecting the failure condition, sending a first notification from the dMAG management system to the second dMAG, wherein the first notification instructs the second dMAG to take over operation of the first dMAG;
sending a second notification from the dMAG management system to a dMA node of the plurality of dMA nodes, the dMA node configured to connect a call from a mobile station to an external system via the first dMAG, wherein the second notification indicates that the second dMAG has taken over the operations from the first dMAG and instructs the dMA node to connect calls from the mobile station to the external system via the second dMAG; and
sending a third notification to the external system, wherein the third notification instructs the external system to connect subsequent calls to the mobile station via the second dMAG.

13. The machine-readable storage device of claim 12, wherein the failure condition is detected in response to receiving a message from the first dMAG, wherein the message indicates that the first dMAG is going offline.

14. The machine-readable storage device of claim 12, wherein detecting the failure condition is detected based on a message received from a particular dMA node local to the first dMAG indicating failure of the first dMAG.

15. The machine-readable storage device of claim 14, wherein the operations further comprise notifying the dMA node that the second dMAG is to take over the operation of the first dMAG.

16. The machine-readable storage device of claim 12, wherein the failure condition is detected in response to a message received from a dMAG interface of the external system, the message indicating failure of the first dMAG.

* * * * *

UNITED STATES PATENT AND TRADEMARK OFFICE
CERTIFICATE OF CORRECTION

PATENT NO.         : 9,755,931 B2                                   Page 1 of 1
APPLICATION NO.    : 14/184120
DATED              : September 5, 2017
INVENTOR(S)        : Shaowei Pan It is certified that error appears in the above-identified patent and that said Letters Patent is hereby corrected as shown below:

In the Claims

Claim 10, Column 16, Line 6: reads as "received from a from the dMA node" and should read as --received from the dMA node--.

Signed and Sealed this
Eleventh Day of November, 2025

John A. Squires
*Director of the United States Patent and Trademark Office*